(12) United States Patent
Chen et al.

(10) Patent No.: US 6,555,630 B1
(45) Date of Patent: Apr. 29, 2003

(54) CATALYTICALLY ACCELERATED GASEOUS PHASE REACTIONS

(75) Inventors: Peter Chen, Ethz, Universitätsstrasse 16, CH-8092, Zürich (CH); Dietmar A. Plattner, Eibenstrasse 11, CH-8045, Zürich (CH); Christian Hinderling, Cullmannstrasse 34, CH-8006, Zürich (CH); Derek Feichtinger, Im Bad 1, CH-8128, Hinteregg (CH); Christian Adlhard, Zürich (CH)

(73) Assignees: Peter Chen, Zurich (CH); Dietmar A. Plattner, Zurich (CH); Christian Hinderling, Zurich (CH); Derek Feichtinger, Hinteregg (CH); Christian Adlhart, Zurich (CH)

( * ) Notice: Subject to any disclaimer, the term of this patent is extended or adjusted under 35 U.S.C. 154(b) by 0 days.

(21) Appl. No.: 09/400,128

(22) Filed: Sep. 21, 1999

(30) Foreign Application Priority Data

Jan. 23, 1998 (CH) ............................................. 162/98

(51) Int. Cl.$^7$ ................................................. C08F 2/34
(52) U.S. Cl. ............................. 526/88; 526/78; 526/90; 526/127
(58) Field of Search ............................. 526/78, 88, 90, 526/127, 901

(56) References Cited

PUBLICATIONS

Bochmann et al., "Base–free cationic 14–electron alkyls . . . " J. Organomet. Chem. 434: C1–C5, 1992.*
Alameddin, N.G. et al. (1995), "Intrinsic Ancillary Ligand Effects in Cationic Zirconium Polymerization Catalysts: Reactions of [L$_2$ZrCH$_3$]$^+$ Cations with H$_2$ and C$_2$H$_4$," Organometallics 14:5005–5007.

Armentrout, P.B. (1981), "Periodic Trends in Transition Metal–Hydrogen, Metal–Carbon, and Metal–Oxygen Bond Dissociation Energies. Correlation with Reactivity and Electronic Structure." J. Am. Chem. Soc. 103:6501–6502.
Armentrout, P.B. and Beauchamp. J.L. (1981), "Ion Bean Studies of the Reactions of Atomic Cobalt Ions with Alkanes: Determination of Metal–Hydrogen and Metal–Carbon Bond Energies and an Examination of the Mechanism by which Transition Metals Cleave Carbon–Carbon Bonds," J. Am. Chem. Soc. 103:784–791.
Armentrout, P.B. (1995), "Building Organimetallic Complexes from the Bare metal: Thermochemistry and Electronic Structure along the Way," Acc. Chem. Res. 28:430–436.
Asubiojo, O.I. and Brauman, J.I. (1979), "Gas Phase Nucleophilic Displacement Reactions of Negative Ions with Carbonyl Compounds," J. Am Chem. Soc. 101:3715–3724.
Beck, S. et al. (1996), "Binuclear zirconocene cations with $\mu$–CH$_3$–bridges in homogeneous Ziegler–Natta catalyst systems," J. Mol. Catalysis A 111:67–79.

(List continued on next page.)

Primary Examiner—David W. Wu
Assistant Examiner—William K. Cheung
(74) Attorney, Agent, or Firm—Greenlee, Winner and Sullivan, P.C.

(57) ABSTRACT

This invention relates to a process for carrying out an anionically or cationically catalytically accelerated gas phase reaction and particularly relates to a process for carrying out a catalytically accelerated gas phase polymerization reaction. The process involves the step of introducing a catalyst ion into a gaseous reaction mixture as a free anion or cation without a corresponding counterion and substantially solvent free. The catalyst of this invention can, for example, be a Ziegler-Natta catalyst or a metallocene catalyst. The gas phase reaction that is catalyzed can, for example, be a metathesis reaction, a metathesis ring-opening polymerization reaction, or a gas phase polymerization.

17 Claims, 3 Drawing Sheets

OTHER PUBLICATIONS

Halle, L.F. et al. (1982), "Ion Beam Studies of the Reactions of Group 8 Metal Ions with Alkanes. Correlation of Thermochemical Properties and Reactivity," Organometallics 1:963–968.

Hinderling, C. et al. (1997), "Direkter Beleg Für einen dissoziativen Mechanismus bei der C–H–Aktivierung durch einen kationischen Iridium(III)–Komplex," Angew. Chem. 109:272–274.

Hinderling, C. et al. (1997), "A Combined Gas–Phase, Solution–Phase, and Computational Study of C–H Activation by Cationic Iridium(III) Complexes," J. Am. Chem. Soc. 119:10793–10804.

Hornung, G. et al. (1997), "Regiospecific and Diastereoselective C–H and C–Si Bond Activation of ω–Silyl–Substituted Alkane Nitriles by "Bare" $Co^+$ Cations in the Gas Phase," J. Am. Chem. Soc. 119:2273–2279.

Hornung, G. et al. (1995), "Diastereoselective Gas–Phase Carbon–Carbon Bond Activation Mediated by "Bare" $Co^+$ Cations," J. Am. Chem. Soc. 117:8192–8196.

Irikura, K.K. and Beauchamp, J.L, (1991), "Electronic Structure Considerations for Methane Activation by Third–Row Transition–Metal Ions," J. Phys. Chem. 95:8344–8351.

Irikura K.K. and Beauchamp, J.L. (1991), "Methane Oligomerization in the Gas Phase by Third–Row Transition–Metal Ions," J. Am. Chem. Soc. 113:2769–2770.

Irikura, K.K. and Beauchamp, J.L. (1989), "Osmium Tetroxide and Its Fragment Ions in the Gas Phase: Reactivity with Hydrocarbons and Small Molecules," J. Am. Chem. Soc. 111:75–85.

Jacobson, D.B. and Freiser, B.S. (1985), "Reactions of $FeCH_2^+$ and $CoCH_2^+$ with Cyclic Alkanes in the Gas Phase," J. Am. Chem. Soc. 107:67–72.

Jacobson, D.B. and Freiser, B.S. (1985), "Reactions of $FeCH_2^+$ and $CoCH_2^+$ with Olefins in the Gas Phase. Studies Involving Olefin Metathesis," J. Am. Chem. Soc. 107:2605–2612.

McMahon, T.B. et al. (1988), "Methyl Cation Affinities," J. Am. Chem. Soc. 110:7591–7598.

Mohr, B et al. (1996), "Synthesis of Water–Soluble, Aliphatic Phosphines and Their Application to Well–Defined Ruthenium Olefin Metathesis Catalysts," Organometallics 15:4317–4325.

Olmstead, W.N. and Brauman, J.I. (1977), "Gas–Phase Nucleophilic Displacement Reactions," J. Am. Chem. Soc. 99:4219–4228.

Pellerite, M.J. and Brauman, J.I. (1980), "Intrinisic Barriers in Nucleophilic Displacements," J. Am. Chem. Soc. 102:5993–5999.

Schroder, D. et al. (1994), "Reaction Products, Directionalities, and Mechanisms of Iron(I)–Mediated CH–, CC–, and CO–Bond Activation of Aliphatic Carboxylic Acids in the Gas Phase," J. Am. Chem. Soc. 116:5857–5864.

Schwab, P. et al. (1996), "Synthesis and Aplications of $RuCl_2(=CHR')(RP_2)_2$: The Influence of the Alkylidene Moiety on Metathesis Activity," J. Am. Chem. Soc. 118:100–110.

Sharma, S. and Kebarle, P. (1982), "Chloronium Ions as Alkylating Agents in the Gas–Phase Ion–MOlecule Reactions with Negative Temperature Dependence," J. Am. Chem. Soc. 104:19–24.

Spence, T.G. et al. (1997), "Controlled Synthesis of Transition–Metal Ion Complex/Solvent Clusters by Electrospray Ionization," J. Phys. Chem. 101:139–144.

Stevens, A.E. and Beauchamp, J.L. (1979), "Properties and Reactions of Manganese Methylene Complexes in the Gas Phase. The Importance of Strong Metal–Carbene Bonds for Effective Olefin Metathesis Catalysts," J. Am. Chem. Soc. 101:6449–6550.

Sunderlin, L.S. et al. (1993), "Bond Strengths in First–Row––Metal Carbonyl Anions," J. Am. Chem. Soc. 115:12060–12070.

Sunderlin, L.S. and Squires R.R. (1993), "Energetics and Mechanism of the Thermal Decarboxylation of $(CO)_4FeCOOH$ in the Gas Phase," J. Am. Chem. Soc. 115:337–343.

Uppal, J.S. et al. (1981), "Gas–Phase Ion Chemistry of $TiCl_4$ and $CH_3TiCL_3$. Reaction of $CH_3TiCl_2^+$ with Ethylene," J. Am. Chem. Soc. 103:508–511.

Wesendrup, R. and Schwarz, P. (1997), "Catalytic Benzene Formation in the Gas–Phase Reactions of $MC_4H_4^+$ (M—Ru, Rh) with $C_2H_2$," Organomet. 16:461–466.

Whitehouse, C.M. et al. (1985), "Electrospray Interface for Liquid Chromatographs and Mass Spectrometers," Anal. Chem. 57:675–679.

* cited by examiner

CATALYTICALLY ACCELERATED GASEOUS PHASE REACTIONS

The present invention concerns a process for running an anionically or cationically catalytically accelerated gas phase reaction, a process for running catalytically accelerated gas phase polymerization, as well as applications of the process and polymerizates produced according to the process of the invention.

The catalysts in anionically or cationically catalytically accelerated gas phase reactions or in a reactor with a wet suspension are generally arranged on supports and enclosed on this account.

In the case of catalysts arranged on supports for running so-called heterogeneous catalysis, the support together with catalyst is held in the gaseous reaction mixture by means of a fluidized bed. Especially in polymerization in the gas phase, like production of polyolefins, catalysts arranged on supports are used in which so-called metallocene-based catalysts have recently come into use, which are arranged on silica gel or magnesium chloride as support particles, among other things. The major advantage of these catalysts based on metallocene compounds is that selective or controlled reactions are made possible and production of polymers with substantially improved properties relative to now common polymers is made possible, especially in terms of elasticity, heat deflection temperature, hardness, etc.

However, the production of such cataysts based on the metallocene compounds is still very costly and intricate in that the substance forming the catalyst must initially be deposited on the support and then activated, for example, by alkylation agents or with so-called Lewis acids. However, production of the corresponding polymers, like polyolefins, based on such metallocene catalysts, is therefore also very expensive.

When ionic catalysts dissolved in solvents are used, there is a problem that the reaction rate must generally be adversely affected by the presence of a solvent and the counterion. Moreover, the solvent can partially react with the catalyst or form complexes by addition to the active anion and cation so that the activity of the catalyst is reduced. In addition, the solvent destroys favorable electrostatic interaction that exists in the gas phase. These catalysts are generally so-called Ziegler-Natta catalysts and catalysts appropriate for running so-called metathesis processes.

It is therefore a task of the present invention to propose a process by introducing anionic or cationic catalysts to a gas phase reaction mixture for catalytic acceleration of the reaction without the drawbacks just described.

This task is solved according to the invention by a process according to the wording, especially of claim 1.

It is proposed that the active anion or active cation that forms the catalyst be introduced as a free anion or cation without a corresponding counterion, as well as at least largely free of any solvent, into the gaseous reaction mixture.

According to one variant it is proposed that the substance forming the catalyst initially be activated introduced or dissolved in a solvent and the solvent as well as the counterion then largely eliminated before introduction to the gaseous reaction mixture.

Introduction of an anion or cation without a corresponding counterion and essentially solvent-free is possible by introducing the catalyst to the gaseous reaction mixture by electrospray ionization, thermospray ion vaporization or with so-called atmospheric pressure ionization.

So-called Ziegler-Natta catalysts or metallocene catalysts that are initially dissolved and activated in an appropriate solvent are suitable in particular as catalysts. Spraying of the so dissolved and activated catalyst then occurs by electrospray, thermospray or ion vaporization or by atmospheric pressure ionization, in which case spraying generally occurs under high pressure with simultaneous enclosure of the spray cloud in an inert gas, like nitrogen or a noble gas. By heating and application of a vacuum at least part of the spray solvent is eliminated and the counterion corresponding to the catalyst is eliminated by application of an electrical potential or electrical voltage. The anion or cation now so isolated, which serves the reaction as catalyst, is then introduced to a reaction space in which the gaseous reaction mixture or the gaseous monomer to be polymerized is arranged. It is then possible to arrange several reaction stages or spaces in succession in order to run consecutive, chain-forming polymerization reactions, especially in the case of polymerization.

Because of this relatively simple production of extremely efficient anionic or cationic catalysts (i.e., with $10^6$–$10^7$ times higher reactivity) for catalytic acceleration of gas phase reactions it becomes possible, for example, to make the still costly but technically superior metallocene-based polyolefin production process cheaper and in fact in a cost range corresponding to that of linear high-density polyethylene and polypropylene production processes. The production process cost difference is now no longer a result of the difference in production of the catalyst, but merely the difference in production of the monomer.

Similarly favorable results can generally be achieved in gas phase reactions accelerated with Ziegler-Natta catalysts and ring opening metathesis polymerization reactions in the gas phase, in which cationic catalysts are generally used. Simple polymerization of, say, gas phase olefin monomer molecules can be induced by electrospray or ion vaporization of the catalyst.

The invention is now further explained below using a reactor arrangement according to FIG. 1 and with reference to the subsequently cited examples of gas phase reactions.

Figure 1:
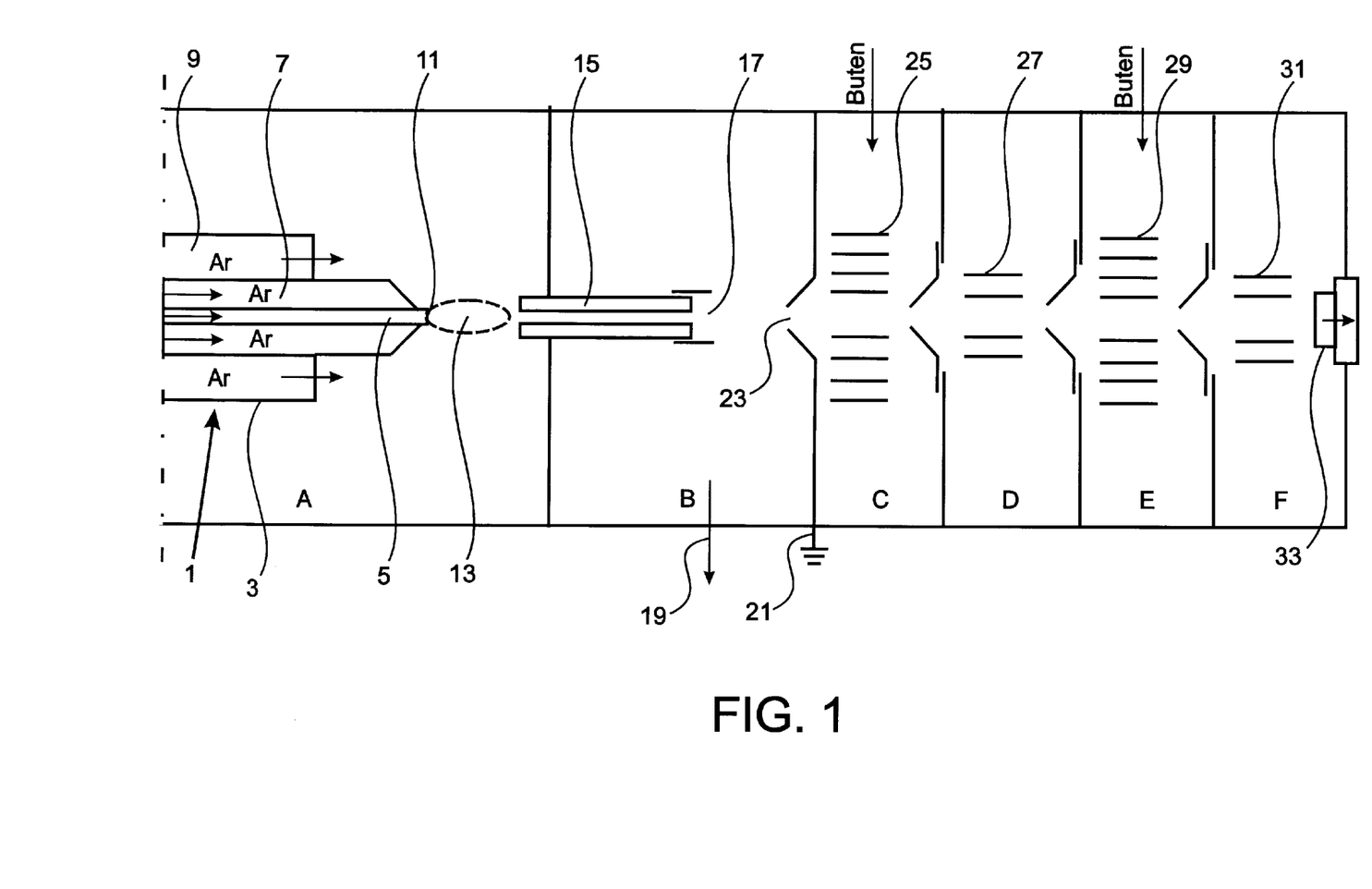
FIG. 1 is a schematic depiction of a reaction arrangement in which the catalyst is introduced to a gaseous reaction mixture by electrospray for carrying out and analysis the catalytically accelerated gas phase reaction.

FIG. 1 schematically depicts in simplified fashion a reaction arrangement in which the catalyst is introduced to a gaseous reaction mixture by electrospray for running and analysis of the catalytically accelerated gas phase reaction and the products produced by the reaction.

FIG. 1 shows an electrospray arrangement generally occurring in mass spectrometers, in which a slightly modified Finnigan MAT-TSQ7000 electrospray tandem mass spectrometer equipped with an octopole-quadrupole-octopole-quadrupole (O1/Q1/O2/Q2) arrangement was used to run the subsequently described arrangement, similar to that described by Armentrout et al. [1] with directed ion beams, but with an electrospray instead of a conventional ion source (see [2]).

The schematically depicted arrangement according to FIG. 1 first shows in simiplified fashion an electron spray ion source 1, which is formed by a cylindrical electrode 3. The solvent loaded with catalysts is introduced via a hypodermic needle or fine inlet tube 5 into a first region A, in which the sprayed solvent with catalyst is schematically shown by means of a spray cloud 13. This hypodermic needle is enclosed by inlet tube 5 for a protective gas, like nitrogen or a noble gas, which is atomized during spraying with the solvent.

A conditioning gas is also introduced to the first region via line 9 in the region of the cylindrical electrode in order to condition the sprayed solvent containing the activated catalyst to a specified temperature.

A voltage is applied in the region of the discharge nozzle 11 of cylindrical electrode 3 on the order of 0 to +8 kV and on the order of 0 to –8 kV. Aoughly atmospheric pressure prevails in the first region A.

The catalyst-electrospray mist is passed from region A into a subsequent region B to a heated capillary 13, on whose end a tubular lens 17 is arranged to which a voltage of about 0 to +200 or 0 to –200 V is applied. The electrospray mist is discharged via this tube lens 17 into a subsequent region B in which a vacuum is applied in order to draw off the evaporated solvent, for example, via a separation pump 19. By the arrangement of a separator 21, which is grounded, the counterion is also trapped so that only the anion or cation responsible for the catalytic acceleration can reach the first reaction region C through the passage opening 23 arranged in the separator, in which a first octopole arrangement 25 is provided. The inert gas or protective gas or conditioning gas is displaced by the reaction gas in this first octopole region so that the catalytically accelerated gas phase reaction is initiated.

Region C is then followed by analytical region D, having a typical quadrupole arrangement for a mass spectrometer for analysis of the reaction mixture.

In a subsequent reaction region E, again having an octopole arrangement 29, the gas phase reaction is continued, for example, to generate oligomers.

In the next analysis region F, again having a quadrupole arrangement 31, the reaction products are again analyzed.

A so-called dinode, as well as an electrical amplifier 33, are arranged at the end of the reaction arrangement.

It is possible to apply different vacuum pressures along the reaction arrangement, i.e., so that a significantly higher vacuum can be applied in the analytical quadrupole regions D and F than in the octopole regions C and E.

FIRST EXAMPLE

Gas Phase Ziegler-Natta Polymerization by Means of Alkyl Zirconocene Cations in an Electrospray Ionization Tandem Mass Spectrometer This example involves the addition of several olefin units to an isolated alkyl zirconocene cation in the gas phase.

Addition of 1-butene to free cations occurs at a diffusion-controlled rate that is $10^7$ to $10^8$ times faster than the corresponding solvent phase addition, in which the metallocene cation is part of an ion pair, often with one or more coordinating ligands (for example, solvent). The observed reaction corresponds to the multiple chain reaction steps of a Ziegler-Natta polymerization [3], which has best been investigated in solution with similar homogeneous catalysts but has never been observed beforehand in mass spectrometer studies of isolated ions. Since industrial production of metallocene-based polyolefins is often run in solvent-free gas phase reactors with "homogeneous" catalysts applied to an inert, solid support, the reaction in a tandem mass spectrometer can be viewed as a reasonable model for the industrial process and can therefore furnish appropriate analytical and mechanistic possibilities.

The electrospray ionization tandem mass spectrometer (ESI-MS/MS) experiment [4,5] was conducted in a modified Finnigan MAT-TSQ7000 mass spectrometer, as described with reference to FIG. 1. Solutions of the tetraperfluorophenyl borate salt of methyl-zirconocene cation I $(Cp_2ZrCH_3)^-$, suitable for electrospray, were produced by treating a $10^{-3}$M solution of $Cp_2Zr(CH_3)_2$ in acetonitrile with somewhat less than one equivalent of dimethylanilinium tetraperfluorophenyl borate [6] as activation acid, followed by ten-fold dilution with $CH_2Cl_2$.

The solutions were sprayed by means of the electrospray apparatus under "high" pressure of 10 mtorr argon (The maximum pressure was limited by the pumps. Higher pressures should improve the reaction.), in which argon served as conditioning or thermalization gas in the first octopole region. The distribution and intensities of the deflections in the mass spectrum were extremely sensitive to traces of water, oxygen and other contaminations in the inlet system to the spectrometer. However, a large deflection corresponding to $(I+CH_3CN)$ could be reproducibly observed. The use of 1-butene instead of argon in the first octopole region and an increase in potential of the capillary tube lens in order to eliminate acetonitrile ligands, led to the formation of new peaks, among which the masses corresponding to II (n=1) and III were most pronounced. Adduct II (n=1) is the product of insertion of an olefin unit into the Zr—C bond of I, whereas III represents the product formed by $H_2$ loss in II. The mass selection of II (n=1) in the first quadrupole arrangement and collision with more 1-butene (10 mtorr, almost zero collision energy) in the second octopole region gave the daughter ion mass spectrumshown in FIG. 2.

The addition of further olefin units undoubtedly occurred, clearly recognizable with II (n=1–3) and detectable with II (n=4) if the scale is enlarged ten-fold.

Reaction of I with isobutene instead of 1-butene in the first optopole region gives a significant peak as a result of the addition product with no subsequent loss of $H_2$ and only a small peak corresponding to a $CH_4$ loss (see below).

The present results confirm the first observation of a Ziegler-Natta polymerization accelerated by isolated metallocene catalyst molecules in the gas phase. Further efforts to observe polymerization reaction in ICR (ion cyclotron resonance) experiments [7], mostly by Richardson, Eyler et al. [8], always led to production of III. For a large number of α-olefins investigated by Richardson and Eyler, a similar compound to III (or a product derived from it) was the only observed product of reaction of I with olefins containing a β-hydrogen. However, all gave a product similar to II (n=1), but no subsequent products. In the case of α-olefins that contain no β-hydrogen, like isobutene and α-methylstyrene, Richardson and Eyler mentioned exclusive conversion to products that are obtained by loss of $CH_4$. Isotope-labeled experiments in the later experiments showed conclusively that the $CH_4$ loss reaction from the π-complex follows in competition with (probably subsequent) insertion of the olefin units into the Zr—C bond. The hydrogen loss, as well as $CH_4$ loss products, of which it is assumed that they have π-allyl structures, are catalytically inactive in Ziegler-Natta polymerization. Addition of more than one unit of an olefin could not be observed accordingly.

Neither the hydrogen loss nor the $CH_4$ loss reactions could be observed in Ziegler-Natta polymerization reactions in solution or in the gas phase at atmospheric pressure. Richardson and Eyler explained the difference between their results and the condensed phase results by insufficient conditioning (thermalization) of the intermediate ions, for example, very low ambient pressure in II in an ICR spectrometer cell. In addition, the residence times and, very importantly, the collision times are very long and occasionally reach several seconds. The exothermicity of an insertion reaction can be easily estimated as the difference in bond energy between a C—C single bond and the π-component of a C=C double bond, which reaches 20 to 25 kcal/mol (the Zr—C bond intensity is compensated).

Accordingly, II is formed as chemically activated species, which in the absence of collision behaves most favorably in terms of entropy, namely by dissociation. Enthalpy-favored reactions, like addition reactions, generally occur under high pressure or condensed phase conditions. The present results with reaction of electrosprayed ions under relatively high pressure conditions correspond more to the condensed phase results than those in ICR high vacuum. This effect is attributed to the more efficient thermalization or conditioning in the experiments with increased pressure, and also to the shorter reaction times as a property because of the selected mass spectrum design. In particular, because of the complete absence of hydrogen loss from II (n>1), increased state densities are obtained connected with growing alkyl side chains that sufficiently inhibit the hydrogen loss reaction so that collision stabilization of the adduct is made possible. It can be concluded from this that the results from the employed ESI-MS/MS technique are directly applicable to reactions under more known conditions. Nevertheless, the inherent flexibility and current potential of the tandem mass spectrum measurements are obtainable by the present reaction arrangement [9].

The most impressive difference between the present gas phase results and the similar reaction in solution is obtained by the enormous reaction rate acceleration. A kinetic study of the $Cp_2ZrCl_2$/MAO system in solvent phase olefin polymerization gave a value $k_p$=168–1670 $M^{-1}$ $sec^{-1}$ at 70° C. with an absolute upper limit of $k_p \leq 5000$ $M^{-1}sec^{-1}$ with 75–100% of the available zirconium, present in a catalytically active form [20]. If only the highest second-order rate constant is assumed and this is multiplied by means of the concentration of 1-butene corresponding to a pressure of 10 mtorr in the second octopole region, we obtain a pseudofirst-order rate constant of $k_p' \sim 2.5 \times 10^{-3}$ $sec^{-1}$. The first lifetime of an alkyl-zirconocene cation with reference to addition of an olefin is thus: $\tau = 1/k_p' \sim 400$ sec. In a previous study the transit time in the second octopole region was determined at roughly 10 μsec. Investigation of the following peak intensities of II (n=1–4) in FIG. 2, however, shows that the observed lifetime corresponds roughly to the transit time, i.e., $\tau \sim 10$ μsec, which means that the reaction of the isolated alkyl-zirconocene cations of the gas phase in the absence of the solvent and a counterion runs about $10^7$ to $10^9$ [or $10^8$] times more quickly than the similar solvent phase. This indicates a diffusion-controlled reaction in the mass spectrometer.

Figure 2:
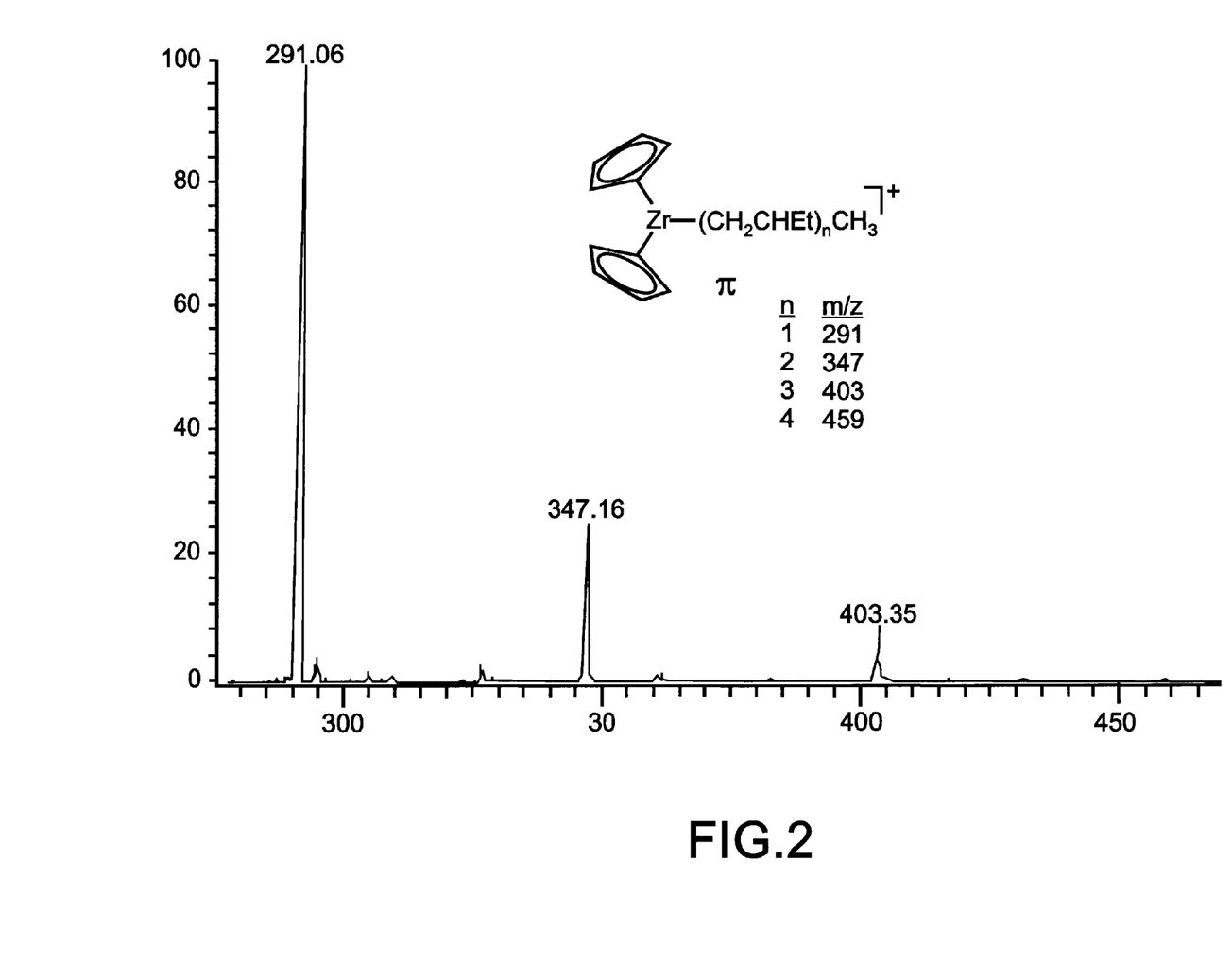
FIG. 2 is a daughter-ion spectrum taken by electrospray of $[Cp_2Zr\text{—}CH_3]^{+-}B(C_6F_5)_4$, in dilute $CH_2Cl_2/CH_3CN$ solution, thermalization and reaction in octopole 1 (FIG. 1) with 1-butene, mass-selection of m/z=291 in quadrupole 1 (FIG. 1), further reaction with more 1-butene in octopole 2 (FIG. 1) under near-zero energy, multiple collision conditions, and finally mass analysis in quadrupole 2 (FIG. 1). A small peak at m/z=459 can be seen if the scale is enlarged. Addition of up to four units of 1-butene is evident, clearly showing that the Ziegler-Natta polymerization reaction proceeds in the mass spectrometer with completely unsolvated Complexes.

FIG. 2 shows the daughter ion spectrum recorded by electrospray of $[Cp_2Zr—CH_3]^{+-}B(C_6F_5)_4$, dissolved in $CH_2Cl_2/CH_3CN$, thermalization and reaction in octopole 1 with 1-butene, mass selected from m/e=291 in quadrupole 1, further reaction with addition of 1-butene in octopole 2 under low energy, multiple collision conditions and finally mass analysis in quadrupole 2. A small peak at m/e=459 is recognizable if the scale is enlarged. The addition of up to four units of 1-butene is recognizable, from which it clearly follows that the Ziegler-Natta polymerization reaction in the mass spectrometer proceeds with fully undissolved complexes. Although initially surprising, the result is reasonable based on two reasons:

(i) Absence of a counterion or any charge generation itself by a weakly coordinating solvent molecule and also because of the absence of a pre-equilibrium in order to form the active species [21], the isolated cations should be more reactive, and (ii) the electrostatic interaction [22] of either the ion dipole or ion-induced dipole, which is shielded in solution, efficiently reduces the activation energy of a bimolecular ion molecular reaction by 10 to 20 kcal/mol in comparison with the same reaction in solution. For a solvent phase reaction with $E_a \sim 10$–12 kcal/mol (considering $k_p \sim 10^3$ $M^{-1}sec^{-1}$) the corresponding gas phase ion molecule reaction should be diffusion-controlled. If this explanation is correct, the rate acceleration should be applicable to any gas phase catalytic reaction of undissolved ionic catalyst without counterions. There is the additional suspicion that the high pressure polymerization of an α-olefin (atmospheric pressure instead of the employed roughly 10 mtorr) with an electrosprayed Ziegler-Natta catalyst gives a product with a very narrow distribution of chain lengths. Once the growing chain length is long enough "to break" by itself, the rate can diminish, which leads to a self-regulating behavior of subsequent polymerization.

To summarize, it can therefore be established that Ziegler-Natta polymerization of a simple olefin by means of an undissolved metallocene catalyst molecule could be observed in the gas phase for the first time without a counterion. The chemistry of incorporation of an olefin unit in the metal-carbon bonds corresponds to the condensed phase and high-pressure gas phase chemistry, but with an extraordinary increase in rate by a factor of $10^6$ to $10^7$, which is employed in industrial production methods of stereouniform high-performance polyolefins.

EXAMPLE 2

Olefin Metathesis and Ring Opening Metathesis Polymerization by Means of an Electrosprayed Ruthenium-carbene Complex in the Gas Phase An olefin metathesis reaction [10] and a ring opening metathesis polymerization in the gas phase by means of the water-soluble Grubbs [11] ruthenium-benzylidene complex IV could be observed mass spectrometrically. In addition to a first observation of an olefin metathesis in the gas phase by means of a complex which gives the same reaction in solution, the present mass spectrometric study surprisingly offers the certainty that gas phase reactions of an $RuCl_2$ $(=CHPh)(PR_2 R^1)_2$ complex runs essentially similar to the corresponding reactions in solution in every respect, except for an extraordinary increase in rate by a factor of $>10^6$.

Electrospray ionization [4,5] tandem mass spectrometric (ESI-MS/MS) experiments were conducted in a modified Finnigan MAT TSQ-7000 mass spectrometer, as described with reference to FIG. 1. Complex IV was synthesized as described by Mohr, Lynn and Grubbs [11]. A $10^{-6}$M $CH_2Cl_2$ solution of the diiodide salt of IV was then electrosprayed with the olefin (1-butene, norbornene or cyclobutene) [12] at roughly 10 mtorr, in which the olefin served as conditioning and thermalization gas in the first octopole region. Under relatively mild desolvation conditions, for example, a capillary tube lens potential of 44 V, the mass spectrum consisted of the dication IV, a monocation V, corresponding to the loss of a phosphine ligand from IV and a second monocation VI with a mass showing that one of the chloride ligands in V was replaced by an iodide.

Figure 3:
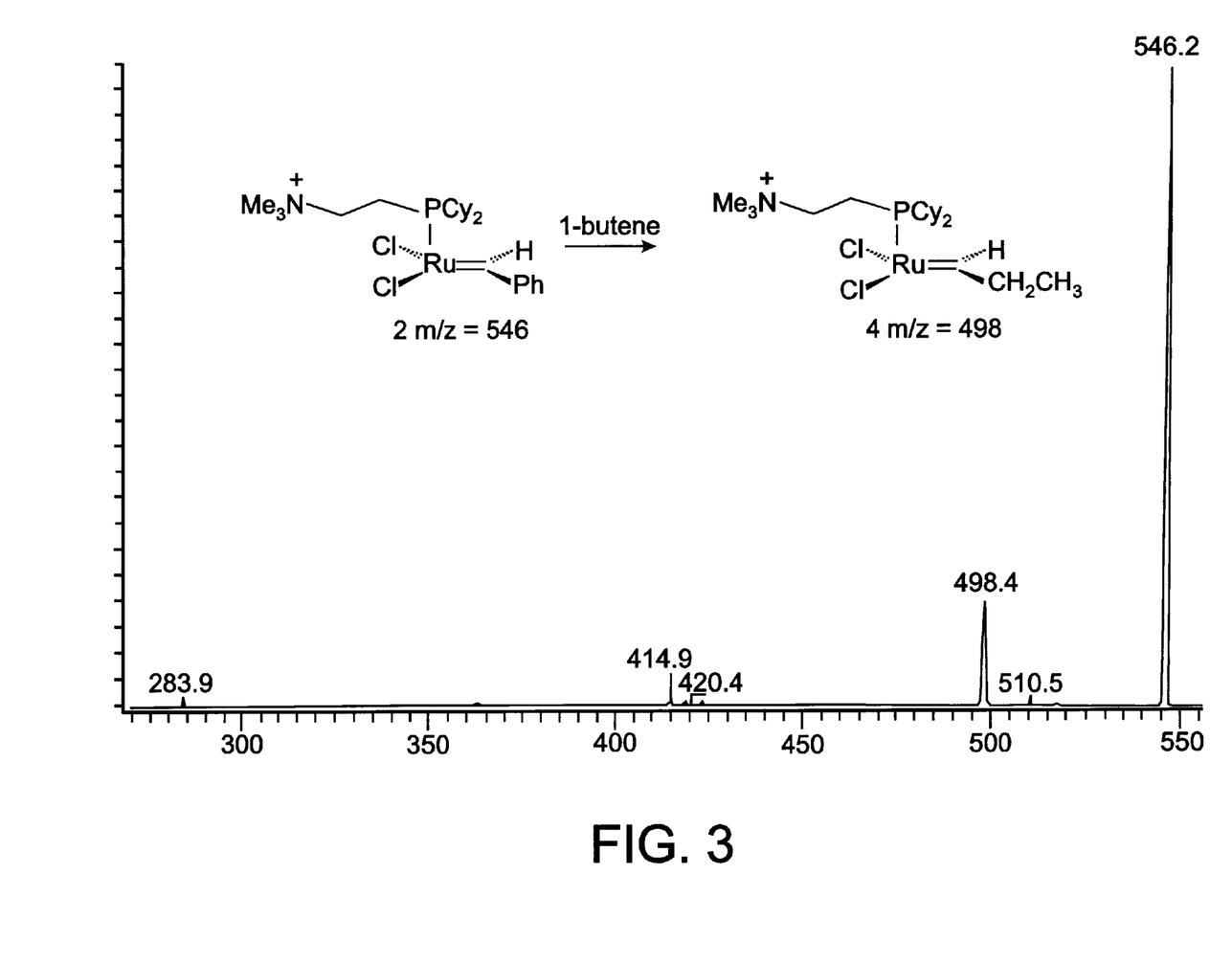
FIG. 3 is a daughter-ion spectrum taken by electrospray of I in dilute $CH_2Cl_2$ solution, desolvation, collisional removal of one phosphine ligand, and thermalization in octopole 1 (FIG. 1), mass selection of m/z=546 in quadrupole 1 (FIG. 1), followed by reaction with 1-butene in octopole 2 (FIG. 1), and finally mass analysis in quadrupole 2 (FIG. 1).

The use of the dichloride salt of IV instead of diiodide eliminated VI. The capillary tube lens potential was increased to 150 V so that initially IV and then V disappeared and a new peak appeared whose mass corresponds to the olefin. In the case of 1-butene as olefin the new mass corresponded to the ruthenium-propylidene complex VII, which results from an olefin metathesis with reaction with loss of styrene. Complexes IV and VI added no olefins in comparable experiments. Moreover, if both IV or V were mass selected in the first quadrupole region and then reacted with 1-butene in the second octopole region, the only metathesis product in both cases was VII (see FIG. 3; FIG. 3 shows a daughter ion spectrum recorded by electrospray of IV in $CH_2Cl_2$ solution, desolvated, collision removal of a phosphine ligand and thermalization in octopole 1, mass selection of m/z=546 in quadrupole 1, followed by reaction with 1-butene in octopole 2 and final mass analysis in quadrupole 2).

With norbornene the new complex VIII exhibited the mass of an adduct of V and norbornene, as would be expected for the product of a one-stage ring opening metathesis polymerization reaction (ROMP). Mass selection of VIII and collision in the second octopole region with either argon or norbornene led to loss of the norbornene mass from the ion and presumably reformation of V.

With the more reactive cyclobutene in the first octopole region during preparation of V an adduct IX detectably appears in the mass spectrum (n=1). A more precise study of the mass spectrum reveals a smaller mass peak for IX (n=2), which leads to the conclusion that a second molecule of cyclobutene was inserted.

Different reaction mechanistic viewpoints can be derived from the data, even without the availability of more accurate thermochemical measurements (via collision-induced reaction transitions [13], which are possible with the present instruments) [14].

Electrospray ionization of medium to large organometallic complexes was first described recently [15], but was not systematically connected [16] with the large number of ion molecule reaction techniques available in conjunction with small gas phase organometallic ions [17]. Other studies in ion molecule chemistry have observed olefin metastasis reactions, especially with different simple metal carbenes [18], like $[Mn=CH_2]^+$, $[Fe=CH_2]^-$ and $[Co=CH_2]^+$, mostly by reaction wit deuterated ethylene. The present results, however, confirm the first example in which it is demonstrated that a solvent phase olefin metathesis catalyst triggers the same reaction in the gas phase. The fact that the gas phase and solvent phase reactions are very similar is critical with reference to the significance of the experiment. The obtained reaction mechanisms show that many features that occur in solvent phase metathesis reactions also occur in gas phase reactions (at least tentatively). Dissociation of a phosphine ligand from the formal 18-e-complex IV appears to be necessary before the metathesis reaction can occur, as demonstrated by the presence of products, like VII and the total absence of metathesis containing two of the phosphine ligands. Norbornene is qualitatively more reactive with V in the mass spectrometer than 1-butene, as is again expected. Addition of the first monomer unit is much simpler with cycloolefins than the subsequent addition. This is consistent with the observation of Grubbs [19] that the ruthenium-benzylidene complexes in solvent phase ring opening metathesis polymerization reaction exhibit much more rapid initial reactions (roughly nine-fold) than the subsequent rates of chain formation. The parallelism of gas phase and solvent phase reactivity is underscored by a concluding observation. The product of metathesis of 1-butene by complex V is ruthenium-propylene VIII and not the alternative ruthenium-methylene. The other possible product-carbene-compound is absent within the signal-to-noise spectra of 50:1 or better. It is assumed that a kinetic preference is represented in the metathesis reaction by this, which is explained by the fact that the reaction is not run under equilibrium conditions. Precisely the same kinetic preference was mentioned by Grubbs [19] during solvent phase reactor of $RuCl_2$ $(=CHPh)(Pcy_3)_2$ with 1-butene, in which the propylidene complex is formed first, before equilibrium is established relative to the thermodynamically favored methylene complex.

The absolute reaction rate forms the exception to the similarities of the gas phase and solvent phase reactions. As in the case of the Ziegler-Natta polymerization in undissolved metallocene cations, the olefin metathesis and ring opening metathesis polymerization reactions described here are accelerated by up to a factor of about $10^7$ relative to the solvent phase rate in the studies of Grubbs [19]. The effect was most probably the result of ion dipole or ion-induced dipole interaction, which is inherent to all ion molecule reactions which can yield roughly 10 kcal/mol for bridging an activation barrier for a bimolecular reaction [23]. The rate increase is not large enough for all metathesis reactions of V to be diffusion-controlled, since the rate difference between addition of the first norbornene or cyclobutene, for example, and the subsequent additions of each olefin is still to be established.

It can be assumed in the ring opening metathesis polymerization reaction V with two cycloolefins that the complexes with masses corresponding to both VIII and XI (n=1) could be only the π-complexes rather than the ring opening metathesis polymerization products. The spontaneously reversible formation of VIII could be interpreted as a proof of such structural assignment. However, the observation of IX (n=2) for cyclobutene, the more reactive of the two cycloolefins, definitively shows that insertion must have occurred.

It should be mentioned as a final point that, whereas Grubbs produced the "cationized" trialkylphosphine ligand to obtain water solubility, the same or similar ligands can be used for a metathesis catalyst merely to produce any uncharged organometallic complex with phosphine ligands suitable for electrospray application in the gas phase. With the widespread phosphine ligands in organometallic chemistry and the wide range of tandem mass spectrometry techniques developed for investigation of ion molecule reactions, the range of possible applications is enormous.

Finally, it could therefore be established that an olefin metathesis by means of a ruthenium-benzylidene complex could be observed mass spectrometrically for electrosprayed ions in the gas phase. Several features of the observed reaction correspond to the observed features for the same complex in solution. An enormous acceleration of the gas phase reaction in comparison with those that occur in solvents, however, can be observed.

From the two cited examples, the present invention naturally should not be limited to the use of metallocene catalysts for running polymerization reactions or Ziegler-Natta catalysts in conjunction with running of metathesis or metathesis ring opening polymerization reactions. The two examples merely serve to explain the present invention further and also to explain the analogy of the reactions by comparison with catalysts applied to supports or catalysts present in solution and thus demonstrate that the introduced anionic or cationic catalysts according to the invention favor the corresponding gas reactions catalytically. Investigations of the corresponding reaction rates have also shown that according to the present invention principle, the corresponding reactions can be accelerated up to $10^7$-fold in comparison with the corresponding reactions run with catalysts supplied to supports or catalysts present in solvents. According to the invention it is therefore not only significantly simpler and cheaper to prepare or introduce the corresponding anionic or cationic catalysts to the reaction mixture, but the reaction itself is also significantly accelerated, which naturally also has commercial effects. Additional reactions that can be accelerated cationically according to the invention are addition reactions of olefins, hydrogenation and dehydrogenation reactions, as well as "normal" cationic or anionic polymerization reactions.

The present examples merely serve to explain the basic principle of the invention and in no case the optimal process conditions. This is not possible, since the two examples were conducted in laboratory units and only the formation of monomers or oligomers was investigated in polymerization reaction, for which reason practical reference to corresponding industrial production is lacking. Parameters, like the electrical potential to be applied, choice of solvent, choice of inert gas, choice of conditioning gas, etc., etc., and finally the parameters to be optimized, which, on the one hand, depend on the reaction being run and, on the other hand, on the dimensions of the corresponding unit, are among these. In particular, application of the potential, choice of inert gas and conditioning is dependent on whether the solvent can be completely eliminated or on whether traces of the solvent still adhere to the catalyst.

It is significant according to the invention that the free anion or free cation, which serves as catalyst for acceleration of the gas phase reaction, is introduced to the gaseous reaction mixture without a counterion and largely solvent-free. This can occur, for example, by electrospray, thermospray or atmospheric pressure ionization. 1. Erwin, K.M. and Armentrout, P.B. (1985) J. Chem. Phys. 83:166. 2. Whitehouse, R.N. et al. (1985), "Die Elektrospray-Quelle Fur massenspektrometrische Anwendungen wurde beschrieben," Anal. Chem. 57:675. 3. A recent collection of reviews covers progress in the field. Fink, G. et al. (eds.), (1995), *Ziegler Catalysts,* Springer, New York. A recent collection of reviews covers progress in the field. 4. The basic electrospray source for mass spectrometry is described by: Whitehouse, C.M. et al. (1985) Anal. Chem. 57:675. 5. A complete monograph on the technique is: Cole, R.D., (ed.) (1997) *Electrospray Ionization Mass Spectrometry,* John Wiley, New York. 6. Generous donation of a sample of dimethylanilinium tetrakis(pentafluorophenyl)borate by Dr. Marc O. Kristen, BASF, is gratefully acknowledged. 7. Uppal, J.S. et al. (1981) J. Am. Chem. Soc. 103:508). 8. Christ, C.S. et al. (1988) J. Am Chem. Soc. 110:4038; Christ, C.S. et al. (1990) J. Am. Chem. Soc. 112:596; Alameddin, N.G. et al. (1995) Organometallics 14:5005. 9. For a recent monograph see: *Organometallic Ion Chemistry,* Freiser, B.S. (ed.) Kluwer, Dordrecht 1996. 10. The olefin metathesis reaction first recognized as such by: Calderon, N. et al. (1967) Tetrahedron Lett. p 3327, is reviewed thoroughly in a recent monograph: *Olefin Metathesis and Metathesis Polymerization,* Ivin, K.J. and Mol. J.C. (eds.) Academic Press, New York, 1997. 11. Mohr, B. et al. (1996) Organometallics 15:4317. 12. Cyclobutene was prepared by E2-elimination from cyclobutyl tosylate. The material was checked by hu 1H nmr to ensure that there was none of the isomeric 1,3-butadiene. 13. Halle, L.F. et al. (1982) Organometallics 1:963; Armentrout P.B. et al. (1981) J. Am. Chem. Soc. 103:6501; Armentrout, P.B. and Beauchamp, J.L. (1981), J. Am. Chem. Soc. (1981) 103:784. For some more recent work on small complexes, see: Sunderlin, L.S. et al. (1993) J. Am. Chem. Soc. 115:12060; Sunderlin, L.S. and Squires, R.R. (1993) J. Am. Chem. Soc. 115:337), which are possible with the present instruments. 14. Hinderling, C. et al. (1997) Angew. Chem. 109:272; (1997) J. Am. Chem. Soc. 119:10793. 15. Colton, R. and Traeger, J.C. (1992) Inorg. Chim. Acta 201:153; Canty, A.J. et al. (1993) Inorg. Chim. Acta 210:91. 16. For a recent exception, see: Spence, T.G. et al. (1997) J. Phys. Chem. A 101:139. 17. For a recent monograph, see: *Organometallic Ion Chemistry,* Freiser, B.S. (ed.) Kluwer, Dordrecht, 1996. For other recent work see, for example: Dieterle, M. et al. (1997) Chem. Phy s. Lett. 277:399; Hornung, G. et al. (1997) J. Am. Chem. Soc. 119:2273; Wesendrup, R. and Schwarz, P. (1997) Organomet. 16:461; Hornung, G. et al. (1995) J. Am. Chem. Soc. 117:8192; Schroder, D. et al. (1994) J. Am. Chem. Soc. 116:5857; Irikura, J.L. and Beauchamp, J. (1991) J. Am. Chem. Soc. 113:2769; Irikura, K.K. and Beauchamp, J.L. (1989) J. Am. Chem. Soc. 111:75; Armentrout, P.B. (1995) Acc. Chem. Res. 28:430; Freise, B.S. (1994) Acc. Chem. Res. 27:353. 18. Stevens, A.E. and Beauchamp, J.L. (1979) J. Am. Chem. Soc. 101:6449; Jacobson, D.B. and Freiser, B.S. (1985) J. Am. Chem. Soc. 107:67; Jacobson, D.B. and Freiser, B.S. (1985) J. am. Chem. Soc. 107:2605. 19. Schwab, P. et al. (1996) J. Am. Chem. Soc. 118:100. 20. Chien, J.C.W. and Wang, B.P. (1990), J. Polym. Sic., Part A 28:15. 21. The importance of counter-ions, solvent effects, and ion-pairing has been discussed. Bochmann, S.J. and Lancaster, S.J. (1992) J. Organomet. Chem. 434:C1; Bochmann, M. Lancaster, S.J. (1994), Angew. Chem. Int. Ed. Engl. 33:1634; Beck S. et al. (1996) J. Mol. Catalysis 111:67. 22. Farneth, W.E. and Brauman, J.I. (1996) J. Am. Chem. Soc. 98:7891; Olmstead, W.N. and Brauman, J.I. (1997), J. Am. Chem. Soc. 99:4219; ASubiojo, O.I. and Brauman, J.I. (1979) J. Am. Chem. Soc. 101:3715; Pellerite, M.J. and Brauman, J.I. (1980) J. Am. Chem. Soc. 102:5993; Sharma, S. and Kebarle, P. (1982), J. Am. Chem. Soc. 104:19; Caldwell, G. et al. (1984) J. Am. Chem. Soc. 106:959; McMahon T.B. et al. (1988) J. Am. Chem. Soc. 110:7591. 23. Farneth, W.E. and Brauman, J.I. (1976) J. Am. Chem. Soc. 98:7891; Olmstead, W.N. and Brauman, J.I. (1977 ), J. Am. Chem. Soc. 101:3715; Pellerite, M.J. and Brauman, J.I. (1980) J. Am. Chem. Soc. 102:5993; Sharma, S. and Kebarle, P. (1982), J. Am. Chem. Soc. 104:19; Caldwell, G. et al. (1984) J. Am. Chem. Soc. 106:959; McMahon T.B. et al. (1988) J. Am. Chem. Soc. 110:7591.

What is claimed is:

1. A process for carrying out an anionically or cationically accelerated reaction in the gas phase comprising the step of introducing a catalyst ion into a gaseous reaction mixture as a free anion or cation without corresponding counterion and substantially solvent-free wherein the catalyst ion is a Ziegler-Natta catalyst.

2. A process for carrying out an anionically or cationically accelerated reaction in the gas phase comprising the step of introducing a catalyst ion into a gaseous reaction mixture as a free anion or cation without corresponding counterion and substantially solvent-free wherein the catalyst ion is a metallocene catalyst.

3. The process according to claim 1 or 2 wherein the catalyst ion is activated in a solvent and the solvent and the corresponding counterion are substantially removed before introduction into the gaseous reaction mixture.

4. The process according to claim 1 or 2 wherein a substance forming a catalyst ion is introduced into a solvent wherein the catalyst ion is associated with a corresponding counterion, the catalyst ion is then activated in the solvent and the solvent is removed by conditioning, applied vacuum, evaporation and optionally by blowoff before introduction of the catalyst ion into the gaseous reaction mixture and wherein the counterion is removed by application of a corresponding electric potential.

5. The process according to claims 1 or 2 wherein the catalyst ion is introduced into the gaseous reaction mixture by electrospray ionization, thermospray ion vaporization, or by atmospheric pressure ionization.

6. The process according to claims 1 or 2 wherein the solvent containing activated catalyst ion is initially sprayed by an electrospray device to remove the solvent and counterion.

7. The process according to claim 1 or 2 wherein the solvent containing activated catalyst ion is initially sprayed by an electrospray device to remove the solvent and counterion and wherein the spraying of the solvent containing the catalyst ion by an electrospray device occurs under essentially atmospheric conditions.

8. The process according to claims 3–5 wherein the spraying of the solvent containing the catalyst ion by an electrospray device occurs under essentially atmospheric conditions.

9. The process according to claims 1 or 2 wherein several reaction regions or reaction stages arranged in succession are provided to carry out a chain reaction or a polymerization reaction catalyzed by the catalyst ion.

10. The process according to claim 3–5 or 7 wherein the reaction in the gas phase that is to be accelerated comprises a metathesis reaction, a metathesis ring-opening polymerization or a gas phase polymerization.

11. The process according to claim 3–5 or 7 wherein the reaction in the gas phase that is to be accelerated produces a polyolefin.

12. A method for producing a polyolefin in a gas phase reaction which comprises the steps of carrying out an anionically or cationically accelerated reaction in the gas phase in which a catalyst ion is introduced into a gaseous reaction mixture as a free anion or cation without corresponding counterion and substantially solvent-free.

13. The method of claim 12 wherein the catalyst ion is introduced into the gaseous reaction mixture by electrospray ionization, thermospray ion vaporization, or by atmospheric pressure ionization.

14. The method of claim 12 wherein the catalyst ion with corresponding counterion is formed in solvent, the catalyst ion is activated in solvent and thereafter solvent is removed by spraying with an electrospray device.

15. The method of claim 12 wherein the catalyst ion is a Ziegler-Natta catalyst.

16. The process of claim 1 wherein the reaction to be accelerated is a gas phase polymerization.

17. The process of claim 2 wherein the reaction to be accelerated is a gas phase polymerization.

* * * * *

UNITED STATES PATENT AND TRADEMARK OFFICE
CERTIFICATE OF CORRECTION

PATENT NO. : 6,555,630 B1
DATED : April 29, 2003
INVENTOR(S) : Chen et al.

It is certified that error appears in the above-identified patent and that said Letters Patent is hereby corrected as shown below:

Title page,
Item [75], Inventors, please replace "Cullmannstrasse 34, CH-8006. Zürich" with
-- Haselstrasse 45, 4103 Bottmingen --; and please replace "Adlhard" with
-- Adelhart --.
Item [73], after "Christian Hinderling", please replace "Zürich" with
-- Bottmingen --.
After Item [22], please insert
-- [63] Related U.S. Application Data
Continuation of application no. PCT/CH99/00029, filed January 22, 1999 --
Item [56], References Cited, OTHER PUBLICATIONS, prior to "Halle", please insert the following references:

Bochmann, M. et al. (1994), "Monomer-Dimer Equilibria in Homo- and Heterodinuclear Cationic Alkylzirconium Complexes and Their Role in Polymerization Catalysis," Angew. Chem. Int. Ed. Engl. 33:1634-1637

Bochmann, M. and Lancaster, S.J. (1992), "Base-free cationic 14-electron alkyls of Ti, Zr and Hf as polymerisation catalysts: a comparison," J. Organomet. Chem. 434:C1-C5

Calderon, H. et al. (1967), "Olefin Metathesis - A Novel Reaction for Skeletal Transformations of Unsaturated Hydrocarbons," Tetrahedron Lett., No. 34, pp. 3327-3329

Caldwell, G. et al. (1984), "$S_N2$ Reactions in the Gas Phase. Temperature Dependence of the Rate Constants and Energies of the Transition States. Comparison with Solution," J. Am. Chem. Soc. 106:959-966

Canty, A.J. et al. (1993), "Coordination complexes and organometallic complexes of palladium and platinum with polydentate ligands containing pyrazole groups and related ligands: an electrospray mass spectrometric study," Inorg. Chim. Acta 210:91-97

Chien, J.C.W. and Wang, B.P. (1990), "Metallocene-Methylaluminoxane Catalysts for Olefin Polymerization. V. Comparison of $Cp_2ZrCl_2$ and $CpZrCl_3$," J. Polym. Sci. Part A 28:15-38

Christ, C.S. et al. (1988), "Gas-Phase Reactions of Bis($\eta^5$-cyclopentadienyl)methylzirconium(1+) with Dihydrogen, Ethylene, and Propylene," J. Am. Chem. Soc. 110:4038-4039

Christ, C.S. et al. (1990), "Insertion and σ-Bond Metathesis Pathways in Gas-Phase Reactions of Bis($\eta^5$-cyclopentadienyl)methylzirconium(1+) with Dihydrogen and Unsaturated Hydrocarbons," J. Am. Chem. Soc. 112:596-607

Colton, R. (1992), "The application of electrospray mass spectrometry to ionic inorganic and organometallic systems," Inorg. Chim. Acta 201:153-155

Dieterle, M. et al. (1997), "Equilibrium studies of weakly bound Fe(L)$^+$ complexes with L = Xe, $CO_2$, $N_2$ and $CH_4$," Chem. Phys. Lett. 277:399-405

Ervin, K.M. and Armentrout, P.B. (1985), "Translational energy dependence of $Ar^++XY \rightarrow ArX^++Y$ (XY = $H_2,D_2$,HD) from thermal to 30 eV c.m." J. Chem. Phys. 83:166-189

Farneth, W.E. and Brauman, J.I. (1976), "Dynamics of Proton Transfer Involving Delocalized Negative Ions in the Gas Phase," J. Am. Chem. Soc. 98:7891-7898

Freiser, B.S. (1994), "Selected Topics in Organometallic Ion Chemistry," Acc. Chem. Res. 27:353-360

UNITED STATES PATENT AND TRADEMARK OFFICE
CERTIFICATE OF CORRECTION

PATENT NO. : 6,555,630 B1
DATED : April 29, 2003
INVENTOR(S) : Chen et al.

It is certified that error appears in the above-identified patent and that said Letters Patent is hereby corrected as shown below:

<u>Column 3,</u>
Line 27, please replace "Aoughly" with -- Roughly --.

<u>Column 5,</u>
Line 2, please replace "optopole" with -- octopole --.

<u>Column 11,</u>
Line 40, please replace "eleimination" with -- elimination --.
Line 41, please replace "hu 1H" with -- $^1$H --.
Line 57, please replace "Phy s." with -- Phys. --.

<u>Column 12,</u>
Line 4, please replace "Sic." with -- Sci. --.
Line 9, after "Brauman, J.I.", please replace "1996" with -- 1976 --.
Line 11, prior to "J. Am. Chem. Soc. 99:4219", please replace "1997" with -- 1977 --.
Line 19, after "J. Am. Chem. Soc.", please insert -- 99:4219; ASubiojo, O.I. and Brauman, J.I, (1979) J. Am. Chem. Soc. --.

Signed and Sealed this

Twenty-fourth Day of February, 2004

JON W. DUDAS
*Acting Director of the United States Patent and Trademark Office*